Dec. 22, 1953           P. BOONE           2,663,171
ORNAMENTAL OBJECT HAVING POLARIZING AND BIREFRINGENT LAYERS
Filed Nov. 22, 1950           2 Sheets-Sheet 1

INVENTOR

Philip Boone

Dec. 22, 1953  P. BOONE  2,663,171
ORNAMENTAL OBJECT HAVING POLARIZING AND BIREFRINGENT LAYERS
Filed Nov. 22, 1950  2 Sheets-Sheet 2

INVENTOR

*Philip Boone*

Patented Dec. 22, 1953

2,663,171

UNITED STATES PATENT OFFICE 2,663,171

ORNAMENTAL OBJECT HAVING POLARIZING AND BIREFRINGENT LAYERS

Philip Boone, Winchester, Mass.

Application November 22, 1950, Serial No. 197,155

18 Claims. (Cl. 63—32)

This invention relates to light-modifying materials and objects and to constructions relating thereto. More particularly, the invention is concerned with materials and objects for providing interference colors of an unusual quality for use in the decorative or ornamental arts, such as for jewelry and other artistic and useful products.

It is well known that a predetermined arrangement of light-polarizing materials and suitable birefringent materials may be used for producing interference colors when placed in a path of light. Such a result may, for example, be achieved by the transmittal of light through polarizing and birefringent materials to a reflecting surface and thence, reversely, through the birefringent and polarizing materials. In such an arrangement, the birefringent material may serve to alter the direction of and provide a retardation between vibration components of light and the polarizer may act both as a light polarizer and analyzer. The aforementioned system may be compared, in operation, to that of a parallel transmission light polarizing system wherein the polarizing directions of a pair of light polarizers are in parallel relation and the optic axis of a birefringent material extends at a predetermined angle relative thereto. Such a system may be considered relative to constructions of the present invention wherein, however, special lens, refracting, reflecting and birefringent means are employed with a polarizer to form self-contained objects which alter the ordinarily "flat" "metallic" quality of the interference colors and provides a crystal-like and more brilliant quality thereof, while reducing the loss of light ordinarily due to reflection of oblique rays from a plane surface. Accordingly, it is an object of the present invention to provide composite materials and products of decorative and useful form wherein interference colors of improved beauty and visibility are obtained.

Another object of the invention is to provide materials and objects of the character described which produce a predominant interference color.

A further object of the invention is to provide such materials and objects wherein a plurality of predetermined interference colors are visible.

Still another object of the invention is to provide a crystal-like quality of the interference colors produced in part by altering the depth from which they appear to emanate.

A still further object of the invention is to provide means for enhancing the brilliance of visible interference colors.

Another object of the invention is to provide materials and objects wherein interference colors are visible from further viewing positions than would be possible in a flat construction.

A further object of the invention is to provide a light-refracting means in the form of a lens or faceted element for altering the path lengths of components of light which are employed in producing interference colors.

Still another object of the invention is to provide adjustable means for varying the interference colors produced.

A still further object of the invention is to provide a product of the character described which is self-contained, durable, suitable for use in jewelry and the decorative arts and which may be produced at a relatively low cost.

These and other objects of the invention will be apparent from the following description taken in connection with the accompanying drawings wherein like reference characters refer to like parts throughout the several views.

This application is a continuation-in-part of my copending application, Serial No. 126,099, filed November 8, 1949.

The examples shown in the drawings are in some instances somewhat enlarged for clarity, particularly as regards the thicknesses of various layers.

Figure 1:
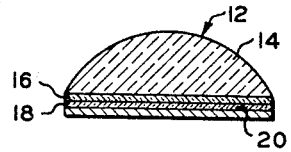
Figs. 1 through 9 are cross-sectional views of various constructions of the invention.

Referring to Fig. 1, object 12 represents a synthetic jewel or the like which exhibits interference colors and is crystal-like in appearance. Object 12 comprises a transparent light-refracting element 14, formed, preferably, of an optical quality glass, possessing qualities of durability and satisfactory light transmission, but it may be formed of a suitable plastic material if desired. Element 14 constitutes a positive or converging lens. A light-polarizing layer 16, for example a film-like light-polarizing material such as is well known in the art, is bonded to the plane lower surface of element 14. A birefringent or retardation layer 18 formed, for example, of a film of suitably oriented polyvinyl alcohol, cellulose acetate, ethyl cellulose or the like is bonded to the lower surface of element 16. The polarizing direction of layer 16 and an optic axis of layer 18 are so disposed as to form an angle relative to one another as, for example, an angle of 45°. A reflecting layer 20 is bonded to the lower surface of layer 18 and may be in the form of a metallic layer deposited upon layer 18 by spraying, deposition in a vacuum or the like, or it may consist of a glass or other form of plate having a reflecting surface. A metal disk formed of aluminum or some other metal having a spectrally-reflecting or a diffusely-reflecting surface is particularly suitable as a reflecting means. Suitable substances for bonding layer 16 to element 14 and for bonding layer 18 to a disk 20 comprises vinyl acetate or methyl methacrylate or a thermoplastic such as polyvinyl butyral. A suitable substance for bonding a birefringent layer 18 of polyvinyl alcohol to light-polarizing layer 16 is a dope formed of a polyvinyl alcohol and water solution. Layers of bonding material are not specifically shown in the drawings but are to be understood as included. It is to be understood that birefringent layer 18 may have one predominant direction of orientation extending angularly with respect to the polarizing direction of layer 16, or that it may have several directions of orientation throughout its area thus forming different angles relative to said polarizing direction. The thickness of birefringent layer 18 may be substantially constant throughout its area or it may vary in different portions. The aforesaid directions of orientation and thicknesses of layer 18 may be controlled by predeterminedly stretching or otherwise treating the material of which layer 18 is formed before assembly in object 12, and layer 18 may also suitably be bonded to polarizing layer 16 prior to such assembly.

Further referring to Fig. 1, it is well known that the type of bifrefringent material employed, its thickness and the direction of an optic axis or optic axes thereof relative to the polarizing direction of an associated light-polarizing layer are controlling factors in the production of predetermined interference colors of a predetermined order or orders. In the present instance, these factors are preferably controlled during formation of the birefringent layer so that first and second order interference colors are produced for maximum brilliance, although other orders may be utilized if desired. Lens 14 serves to enhance the gathering of light and thus the amount thereof passing through the light-polarizing and birefringent layers to the reflecting surface and return. Furthermore, the lens alters the directions of rays which are incident said layers and produces altered retardation effects by varying path lengths, or optical paths, which light rays are caused to traverse through different portions of the birefringent layer. This may, in effect, be said to be equivalent to varying the thickness of said layer in different portions. While interference colors would be visible looking directly upon polarizing layer 16, without the inclusion of lens 14 these colors would appear "flat" and "metallic" in quality. Through the embodiment of lens 14, a "depth" and crystal-like quality is achieved together with a markedly enhanced brilliance or intensity of the interference colors. Furthermore, without inclusion of lens 14 surface reflections would tend to eliminate the visible interference colors entirely when incident rays strike the surface at markedly oblique angles. Thus, it will be seen that the lens element 14 provides a control of interference colors additional to and coacting with those provided by the light-polarizing, birefringent and reflecting elements and that the nature of said control may be varied according to the form and curvature of lens 14. The purity and limpid quality of colors achieved through the foregoing construction as well as the change of colors obtained when the object 12 is viewed from different positions, as, for example, when it is moved, render it particularly adapted to use as a new form of synthetic jewel of remarkable beauty.

It is to be understood that each of the components of the present invention would appear substantially colorless if viewed separately and that it is only through their coaction that colors of the spectrum of incident light are produced. Constructions of the invention are, therefore, not to be confused with those wherein tints or dyes are used in the usual sense.

Figure 2:
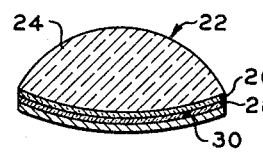

Fig. 2 represents a device 22 which is similar to object 12 of Fig. 1 excepting that positive lens 24 has a convex lower surface and, accordingly, polarizing layer 26, birefringent layer 28 and reflecting means 30 are curved to conform therewith. This construction presents some variation of direction of rays incident the various elements and may offer some small advantage in providing a greater visibility of the interference colors when the device is viewed at oblique angles. However, it is considerably more difficult to fabricate because of the curvatures involved.

Figure 3:
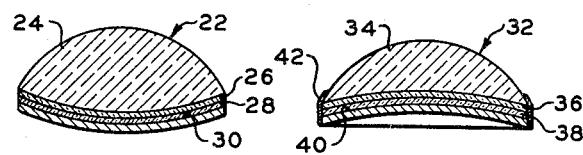

Fig. 3 shows an object 32 comprising positive lens 34, polarizing layer 36, birefringent layer 38 and reflecting means 40. Functionally, the construction offers substantially nothing new relative to those of Figs. 1 and 2 other than a modified form which could be employed if advantageous for a particular use, such as a mounting requirement. Also shown in Fig. 3 is a protective layer 42 which provides an edge seal. Such a layer could be formed of a suitable resinous material such as Polymerin, manufactured by Ault and Wiborg Corporation, or of a substance such as a silicone compound for rendering layers 36 and 38 impervious to moisture.

Figure 4:
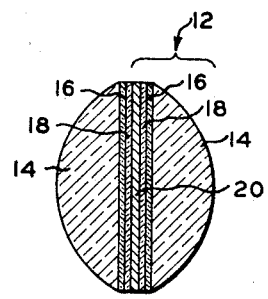

In Fig. 4 an object is formed by bonding two of the objects 12 of Fig. 1 together, utilizing, however, a single reflecting means 20 such as the aforementioned metal disk. The "doubling" of objects 12 in a single unit provides a composite structure which provides the above-described interference color effects when viewed from any direction and which is suitable for use as a pendant.

Figure 5:
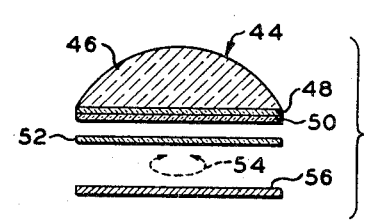

Fig. 5 represents an object 44 of the invention wherein the interference colors may be varied by moving one or more of the elements as, for example, by rotating one of the elements. Object 44 comprises positive lens 46, polarizing layer 48 and birefringent layer 50 in bonded relation and having relative axial directions previously described. A second birefringent layer 52, for example a quarter wave plate, is mounted for rotation as indicated by double-headed arrow 54. The construction is completed by reflecting element 56. A rotational means suitable for rotating layer 52 is shown in my copending application Serial No. 126,099, filed November 8, 1949. Considerable modification of the construction of Fig. 5 is possible as follows: Layer 52 may have its optic axis angularly oriented with respect to the polarizing direction of layer 48 and be bonded to reflecting means 56 while layer 50 is mounted for rotation. Or, layers 50 and 52 may be fixedly mounted with their optic axes at 45° to one another and polarizing layer 48 may be mounted for rotation, said layer 48 preferably remaining in bonded relation to lens 46 to prevent loss of light therebetween by reflection. It will also be apparent that reflecting layer 56 may be bonded to a rotatable or fixed birefringent layer 52.

Figure 6:
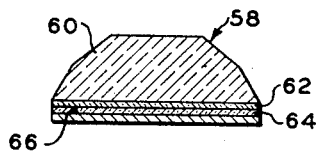

In Fig. 6 an object 58 is shown in which the lens element of previous embodiments is supplanted by a transparent light-refracting element such as faceted component 60, preferably formed of an optical quality glass, although a plastic material could be employed. Other elements of object 58 include a light-polarizing layer 62, a birefringent layer 64 and a reflecting element 66. Relative directions of optic and polarizing axes and bonding of the components, hereinbefore described, are to be understood as pertaining to object 58 also. Faceted element 60, in cooperation with other components of the object, provides interference colors of predetermined color and crystal-like quality which are variable from substantially any position. The faceted surfaces of element 60 may vary as to number and angle in any desired manner, those shown being merely illustrative. It is to be understood that the interference colors produced in this construction are not due to dispersion, as is usually the case in faceted stones, but to the refracting qualities of the faceted element in cooperation with light-polarizing and birefringent components hereinbefore described. It would be possible, however, to provide element 60 with a faceted lower surface, to mount said element in a transparent base of suitable refractive index having a lower surface suitably formed for bonding to polarizing layer 62 and to provide thereby a modification which would additionally show interference colors due to dispersion of light. Faceted element 60 could readily be employed with the construction of Figs. 1 through 5, Fig. 8 and Figs. 12 and 13 to provide further modifications of the invention.

Figure 7:
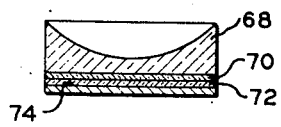

Fig. 7 shows the employment of a negative lens 68 in conjunction with polarizing and birefringent layers 70 and 72, respectively, and a reflecting means 74. While a special effect marked by a reduction of the interference color-producing area is obtained, this constitutes a less preferred embodiment.

Figure 8:
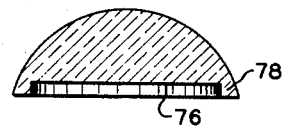

Fig. 8 illustrates a modification of the lens element wherein a recessed lower surface 76 is formed for receiving the aforementioned light-polarizing, birefringent and reflecting components. This construction provides a flange 78 which serves to protect and further to retain edge portions of these components. Element 60 of Fig. 6 may also be similarly formed to include a recessed lower surface.

Figure 9:
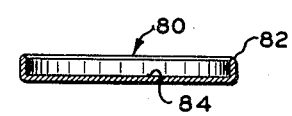

Fig. 9 shows a cap-like element 80, preferably of metal, which may serve to enclose the previously described light-polarizing and birefringent layers, upper portions 82 being turned inwardly, slightly, to grip edge portions of a lens or faceted element. Portion 84 may suitably constitute a reflecting means and thus supplant other means for the purpose. Portion 84 could be curved rather than plane, as shown.

Figure 10:
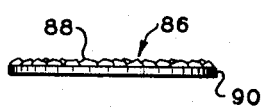
Fig. 10 is an elevation view of a modified reflecting component of the invention.

Fig. 10 represents an alternate form of reflecting means 86 consisting of a plurality of metallic particles 88, such as small fragments or flakes of aluminum or the like, bonded to a support 90.

If desired, particles 88 could be applied directly to the lower surface of any of the underlying birefringent layers shown to provide a reflecting means, a suitable bonding material being employed. Alternatively, said particles could be embedded in a thermoplastic bonding material such as polyvinyl butyral prior to its use as a bonding agent. Particles 88, which are preferably arranged to lie in different planes and at different depths, provide a plurality of reflecting surfaces for differently reflecting incident rays and contribute an opal-like effect in conjunction with other elements described herein.

Figure 11:
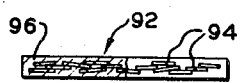
Fig. 11 is a side view, partly in section, of a modified birefringent element of the invention.

Fig. 11 illustrates a modified form of birefringent layer 92 which may be employed in various constructions of the invention. This layer consists of a plurality of particles or flakes or birefringent material 94 surrounded by a bonding material 96, such as polyvinyl butyral. Overlapping of the flakes and a random orientation thereof provides a variation of interference color effects.

Figure 12:
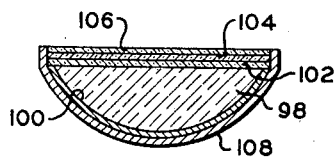
Figs. 12 through 14 are cross-sectional views of other constructions of the invention.

In Fig. 12, a further modification is shown consisting of lens 98 having a reflecting layer 100 applied to a convex surface thereof thus providing a concave mirror, a birefringent layer 102, a light polarizing layer 104 and a glass protective plate 106. Adjacent surfaces of said lens, layers and plate are bonded together. A protective layer 108 is formed upon reflecting layer 100 and edges of layers 102 and 104 and plate 106. This construction lacks the crystal-like quality of other examples but may be utilized for special decorative effects, such as may be provided by a ring-like portion surrounding interference color areas. In general, this form is less preferred than others shown herein.

Figure 13:
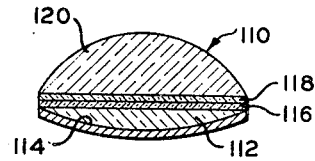

Fig. 13 illustrates an object 110 comprising a lower positive lens element 112 having a reflecting surface 114, a birefringent layer 116, a light-polarizing layer 118 and an upper positive lens element 120, the layers being bonded to one another and to the lens elements as previously described. Object 110 functions to provide interference color effects similar to those produced by the constructions of Figs. 1 and 2 but its more complicated design makes it a less preferred form of embodiment.

Figure 14:
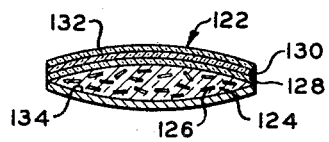

Fig. 14 shows an object 122 providing an opal-like effect. A lens element 124 has a plurality of birefringent or differentially refracting particles 126 embedded therein. Lens 124 may, for example, be formed of polystyrene or methyl methacrylate and particles 126 may consist of small crystalline fragments, glass fragments, bits of polyvinyl alcohol sheet or the like. A birefringent layer 128, a polarizing layer 130 and a glass protective layer 132 are bonded to one another and to lens 124. A reflecting layer 134 is formed upon the under surface of lens 124. Use of the reflecting means shown in Fig. 10 further enhances the opal-like effects obtainable through this construction. Use of a polarizer which has been stretched to provide a "crazing" therein, i. e., "cold" stretched, may also contribute to the opal-like quality of the object. Crazing of a polarizing sheet material, as well as of a birefringent sheet material, may also contribute to an effect of asterism in the object. A "milk" glass may also be employed in forming lens 124 to further said opal-like effect.

Figure 15:
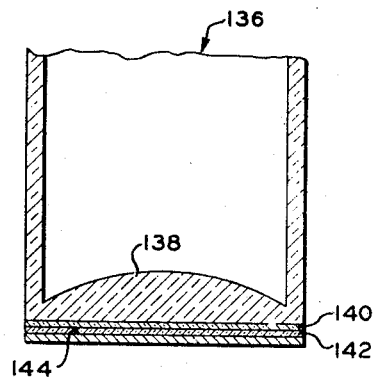
Fig. 15 is a fragmentary cross-sectional view of a construction of the invention incorporated with a utilitarian object for providing a decorative quality therein.
Figure 16:
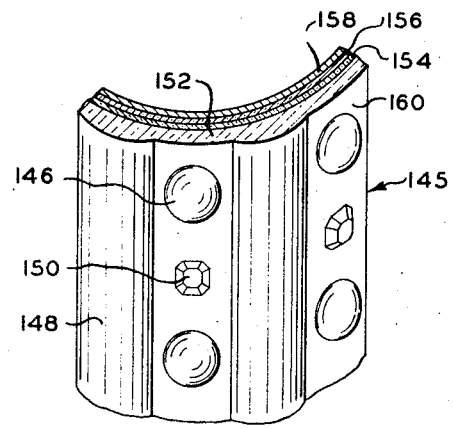
Fig. 16 is a fragmentary perspective view, partly in cross-section, of constructions of the invention incorporated with another utilitarian object.

Figs. 15 and 16 illustrate the incorporation of objects of the invention with transparent utilitarian products wherein said objects form portions of the products for providing interference colors and enhancing the beauty of said products. Fig. 15 shows a fragmentary portion of a glass container 136 such as a vase or drinking glass. The lower portion or base 138 is in the form of a lens. A light polarizing layer 140, a birefringent layer 142 and a reflecting plate 144 are, in order, bonded to base 138 and to one another. Interference color effects hereinbefore described are produced when light is incident lens-like base 138, and said color effects will be transmitted to other portions of container 136 as, for example, side walls thereof. In Fig. 16 a fragmentary portion of a vase, lamp or the like 145 is shown. Lens-like elements 146 and 148 and faceted element 150 are formed integral with or are superposed upon glass portion 152. A light polarizing layer 154 is bonded to the inner surface of layer 152. A birefringent layer 156 is bonded to layer 154 and a reflecting layer 158 is bonded to layer 156. Light incident the outer surface of object 145 provides interference color effects in the various portions as hereinbefore described. Varying retardation effects are also visible in portions 160 because of the curved formation thereof and the differences in path lengths of light rays passing therethrough to the eyes of the viewer. It will be noted that single layers of light polarizing, birefringent and reflecting materials operate in conjunction with a plurality of lens-like and faceted portions.

It will be apparent that other modifications of the materials and products above-described may be made in accordance with the general principles exemplified herein. Accordingly, such examples as have been presented are to be regarded as merely illustrative and the invention may be otherwise embodied and practiced within the scope of the following claims.

I claim:

1. A light-modifying device for providing interference colors of a crystal-like quality and improved visibility comprising, in optical alignment, a transparent lens component, at least a birefringent layer, a layer for polarizing light through its surface area, said light-polarizing layer and at least a birefringent layer being bonded together and said light-polarizing layer being bonded to a surface of said lens component, and a light-reflecting layer positioned contiguous one of said birefringent layer and said lens component, the retardation properties and axial direction of said birefringent layer relative to the polarizing direction of said light-polarizing layer being adapted, in cooperation with said light-polarizing layer, reflecting layer and lens component, to provide interference colors of predetermined color, order, intensity and depth, said colors varying in hue, intensity, pattern and depth when different areas of said lens component are observed.

2. A light-modifying device for providing interference colors of a crystal-like quality and improved visibility comprising, in optically aligned and mutually supporting relation, a transparent positive lens component, a birefringent layer, a layer for polarizing light throughout its surface area, said light-polarizing layer and birefringent layer being bonded together and said light-polarizing layer being bonded to a surface of said lens component, and a light-reflecting layer positioned contiguous one of said birefringent layer and said lens component, the retardation properties and axial direction of said birefringent layer relative to the polarizing direction of said light-polarizing layer being adapted, in cooperation with said light-polarizing layer, reflecting layer and lens component, to provide interference colors of predetermined color, order, intensity and depth, said colors varying in hue, intensity and pattern when different areas of said lens component are observed.

3. A light-modifying device for providing interference colors of a crystal-like quality and improved visibility comprising, in optically aligned and mutually supporting relation, a transparent faceted component, a birefringent layer, a layer for polarizing light throughout its surface area, said light-polarizing layer and birefringent layer being bonded together and said light-polarizing layer being bonded to a surface of said faceted component, and a light-reflecting layer positioned contiguous one of said birefringent layer and said faceted component, the retardation properties and axial direction of said birefringent layer relative to the polarizing direction of said light-polarizing layer being adapted, in cooperation with said light-polarizing layer, reflecting layer and faceted component, to provide interference colors of predetermined color, order, intensity and depth.

4. A light-modifying fabricated jewel for providing interference colors and for altering the quality of said colors comprising, in optically aligned and mutually supporting relation, a magnifying lens element, a light-polarizing layer having a first surface bonded to a surface of said positive lens element, a birefringent layer having a first surface bonded to a second surface of said light-polarizing layer, and a light-reflecting layer bonded to a second surface of said birefringent layer.

5. A light-modifying fabricated jewel for providing interference colors and for altering the quality of said colors comprising, in optically aligned and mutually supporting relation, a transparent faceted element, a light-polarizing layer having a first surface bonded to a surface of said faceted element, a birefringent layer having a first surface bonded to a second surface of said light-polarizing layer, and a light-reflecting layer bonded to a second surface of said birefringent layer.

6. A light-modifying device for providing interference colors and for altering the intensity of said colors and the path lengths of components of light forming said colors comprising, in optically aligned and mutually supporting relation, a transparent converging lens element having a plane surface and an opposite curved surface, a light-polarizing layer having a first surface bonded to said plane surface of the lens element, a birefringent layer having a first surface bonded to a second surface of said light-polarizing layer, and a light-reflecting layer bonded to a second surface of said birefringent layer, the thickness of said birefringent layer and its axial direction relative to the polarizing direction of said light-polarizing layer being so controlled and arranged and the aforesaid layers so coacting with said lens element as to provide predetermined interference colors having the aforesaid altered characteristics and components.

7. A light-modifying device for providing interference colors and for altering the intensity of said colors and the path lengths of components of light forming said colors comprising, in optically aligned and supporting relation, a positive lens element having a flat surface and an opposite surface, a light-polarizing layer having a first surface bonded to said flat surface of the positive lens element, a birefringent layer having a first surface bonded to a second surface of said light-polarizing layer, and a light-reflecting layer bonded to a second surface of said birefringent layer, the thickness of said birefringent layer and its axial direction relative to the polarizing direction of said light-polarizing layer being so controlled and arranged and the aforesaid layers so coacting with said positive lens element as to provide predetermined interference colors having the aforesaid altered characteristics and components.

8. A light-modifying device for providing interference colors and for altering the intensity of said colors and the path lengths of components of light forming said colors comprising, in optically aligned relation, a transparent supporting element having a rear surface and a front surface with a plurality of lens elements formed on said front surface, a light-polarizing layer having a first surface bonded to said rear surface of the supporting element, a birefringent layer having a first surface bonded to a second surface of said light-polarizing layer, and a light-reflecting layer bonded to a second surface of said birefringent layer, the thickness of said birefringent layer and its axial direction relative to the polarizing direction of said light-polarizing layer being so controlled and arranged and the aforesaid layers so coacting with said lens element as to provide predetermined interference colors having the aforesaid altered characteristics and components.

9. A light-modifying device for providing interference colors and for altering the intensity of said colors and the path lengths of components of light forming said colors comprising a positive lens element having a pair of curved surfaces, a light-polarizing layer having a first surface bonded to one of said curved surfaces of the lens element, a birefringent layer having a first surface bonded to a second surface of said light-polarizing layer, and a light-reflecting layer bonded to a second surface of said birefringent layer, the thickness of said birefringent layer and its axial direction relative to the polarizing direction of said light-polarizing layer being predetermined and the aforesaid layers coacting with said positive lens element to provide predetermined interference colors having the aforesaid altered characteristics and components.

10. A light-modifying object for providing variable interference colors and for altering the intensity of said colors and the path lengths of components of light forming said colors comprising a transparent lens element, a light-polarizing layer having a first surface bonded to a surface of said lens element, a birefringent layer having a first surface positioned contiguous a second surface of said light-polarizing layer, a second birefringent layer having a first surface positioned contiguous a second surface of said first-named birefringent layer, and a light-reflecting layer positioned contiguous a second surface of said second birefringent layer, one of said birefringent layers having an optic axis predeterminedly angularly disposed relative to the polarizing direction of said light-polarizing layer and being bonded to one of said light-polarizing and reflecting layers, and the other of said polarizing layers being mounted for rotation to provide various angular relations of an optic axis thereof with respect to said optic axis of the first-named birefringent layer and said polarizing direction of the light-polarizing layer.

11. An assembly according to claim 10 wherein both birefringent layers are fixed in bonded relation with their optic axes forming a predetermined angle with one another, and wherein the light-polarizing layer is mounted for rotation.

12. An assembly according to claim 10 wherein both birefringent layers are fixed in bonded relation with their optic axes forming a predetermined angle with one another and with the more remote of said layers from said lens element bonded to said light-reflecting layer, and wherein said light-polarizing layer and lens element are bonded together and mounted for rotation.

13. A light-modifying device for providing interference colors in substantially any direction and for altering the brilliance of said colors and the path lengths of components of light forming said colors comprising a transparent lens element having a flat surface and an opposite curved surface, a light-polarizing layer having a first surface bonded to said flat surface of said lens element, a birefringent layer having a first surface bonded to the second surface of said light-polarizing layer, a light-reflecting layer having a first surface bonded to the second surface of said birefringent layer, a second birefringent layer having a first surface bonded to the second surface of said light-reflecting layer, a second light-polarizing layer having a first surface bonded to the second surface of said second birefringent layer, and a second transparent lens element having a flat surface and an opposite curved surface, the flat surface of said last-named lens element being bonded to the second surface of said second light-polarizing layer.

14. A light-modifying device in the form of a synthetic jewel or the like for providing interference colors and for altering the brilliance of said colors and the path lengths of components of light forming said colors comprising a transparent lens element, a birefringent layer consisting of a plurality of birefringent particles having their optic axes differently disposed and said particles being fixed in relation to one another by a bonding means, a light-polarizing layer, one of said birefringent and light-polarizing layers being bonded to said lens element and said layers being bonded to each other, and a light-reflecting layer composed of a plurality of light-reflecting particles arranged in different planes and held in fixed relation to one another by a bonding means, that one of said birefringent and light-polarizing layers which is unbonded to said lens element being bonded to said light-reflecting layer.

15. A light-modifying device for providing interference colors and for altering the optical paths traversed by components of light forming said colors comprising a positive lens element, a birefringent layer having a first surface bonded to one surface of said lens element, a layer for polarizing light throughout its surface area having a first surface bonded to the second surface of said birefringent layer, a light-reflecting layer bonded to the second surface of said positive lens element, and protective layer means formed upon external surfaces of said light-polarizing and light-reflecting layers.

16. An assembly according to claim 15 wherein the exposed surface of the light-polarizing layer is devoid of a protective layer and wherein a second positive lens element is bonded to said exposed surface of the light-polarizing layer.

17. A light-modifying device in the form of a synthetic jewel for providing a plurality of interference colors and for altering the path lengths of components of light forming said colors comprising a positive lens element having a plurality of differently light-refracting particles embedded therein, a birefringent layer bonded to a surface of said lens element, a light-polarizing layer bonded to said birefringent layer, and a reflecting layer bonded to a second surface of said lens element which is opposite to said first-named surface thereof.

18. A decorative object comprising a transparent supporting element having a regular surface and an opposite surface incorporating a plurality of lens elements, a light-polarizing layer bonded to said regular surface, a birefringent layer bonded to said light-polarizing layer, and a light-reflecting layer bonded to said birefringent layer, said lens elements and layers coacting to provide predetermined interference colors of light incident said object and serving to alter the path lengths of components of said light forming said colors.

PHILIP BOONE.

References Cited in the file of this patent

UNITED STATES PATENTS

| Number | Name | Date |
|---|---|---|
| 2,017,705 | Sproxton | Oct. 15, 1935 |
| 2,096,696 | Land | Oct. 19, 1937 |
| 2,158,129 | Land | May 16, 1939 |
| 2,287,546 | Binda | June 23, 1942 |
| 2,362,573 | MacNeille | Nov. 14, 1944 |
| 2,519,547 | Colbert et al. | Aug. 22, 1950 |

FOREIGN PATENTS

| Number | Country | Date |
|---|---|---|
| 683,933 | Germany | Nov. 18, 1939 |